US012485906B2

(12) United States Patent
Li et al.

(10) Patent No.: US 12,485,906 B2
(45) Date of Patent: Dec. 2, 2025

(54) MANAGEMENT OF SUPERVISION OF AN ELECTRONIC COMPONENT OF A LAND MOTOR VEHICLE

(71) Applicant: PSA AUTOMOBILES SA, Poissy (FR)

(72) Inventors: Xiaoting Li, Maurepas (FR); Antony Boisserie, Wissous (FR)

( * ) Notice: Subject to any disclaimer, the term of this patent is extended or adjusted under 35 U.S.C. 154(b) by 281 days.

(21) Appl. No.: 18/247,239

(22) PCT Filed: Sep. 7, 2021

(86) PCT No.: PCT/FR2021/051530
§ 371 (c)(1),
(2) Date: Mar. 29, 2023

(87) PCT Pub. No.: WO2022/084592
PCT Pub. Date: Apr. 28, 2022

(65) Prior Publication Data
US 2023/0373500 A1    Nov. 23, 2023

(30) Foreign Application Priority Data
Oct. 20, 2020  (FR) ..................................... 2010747

(51) Int. Cl.
*B60W 50/00*   (2006.01)
*B60W 50/14*   (2020.01)

(52) U.S. Cl.
CPC ........ *B60W 50/0098* (2013.01); *B60W 50/14* (2013.01); *B60W 2050/146* (2013.01)

(58) Field of Classification Search
CPC ............. B60W 50/0098; B60W 50/14; B60W 2050/146; G06F 8/65; G06F 11/0757; G06F 11/3013; G05B 23/0283
See application file for complete search history.

(56) References Cited

U.S. PATENT DOCUMENTS

| | | |
|---|---|---|
| 6,269,478 B1 * | 7/2001 | Lautenbach-Lampe .................... G06F 11/0715 714/E11.003 |
| 2002/0152433 A1 * | 10/2002 | Nishibe ............... G06F 11/0757 714/E11.003 |
| 2015/0210166 A1 | 7/2015 | Nakagawara et al. |
| 2017/0052841 A1 * | 2/2017 | Ogino ................. G06F 11/0745 |
| 2017/0139698 A1 * | 5/2017 | Muroyama ............ G06F 8/656 |
| 2018/0081671 A1 | 3/2018 | Naruse et al. |
| 2018/0231948 A1 | 8/2018 | Mori et al. |

FOREIGN PATENT DOCUMENTS

EP        2685379 A1 *  1/2014  .......... G06F 11/0739

OTHER PUBLICATIONS

International Search Report for PCT/FR2021/051530 mailed Dec. 23, 2021.

* cited by examiner

*Primary Examiner* — Jelani A Smith
*Assistant Examiner* — Alyssa Rorie
(74) *Attorney, Agent, or Firm* — Sandberg Phoenix & von Gontard, PC

(57) ABSTRACT

The invention relates to the management of a scheduled temporary shutdown of an electronic component (ECU) monitored by a supervisory device (VSM), the component and the device being comprised on board a land motor vehicle.

10 Claims, 2 Drawing Sheets

[Fig 1]
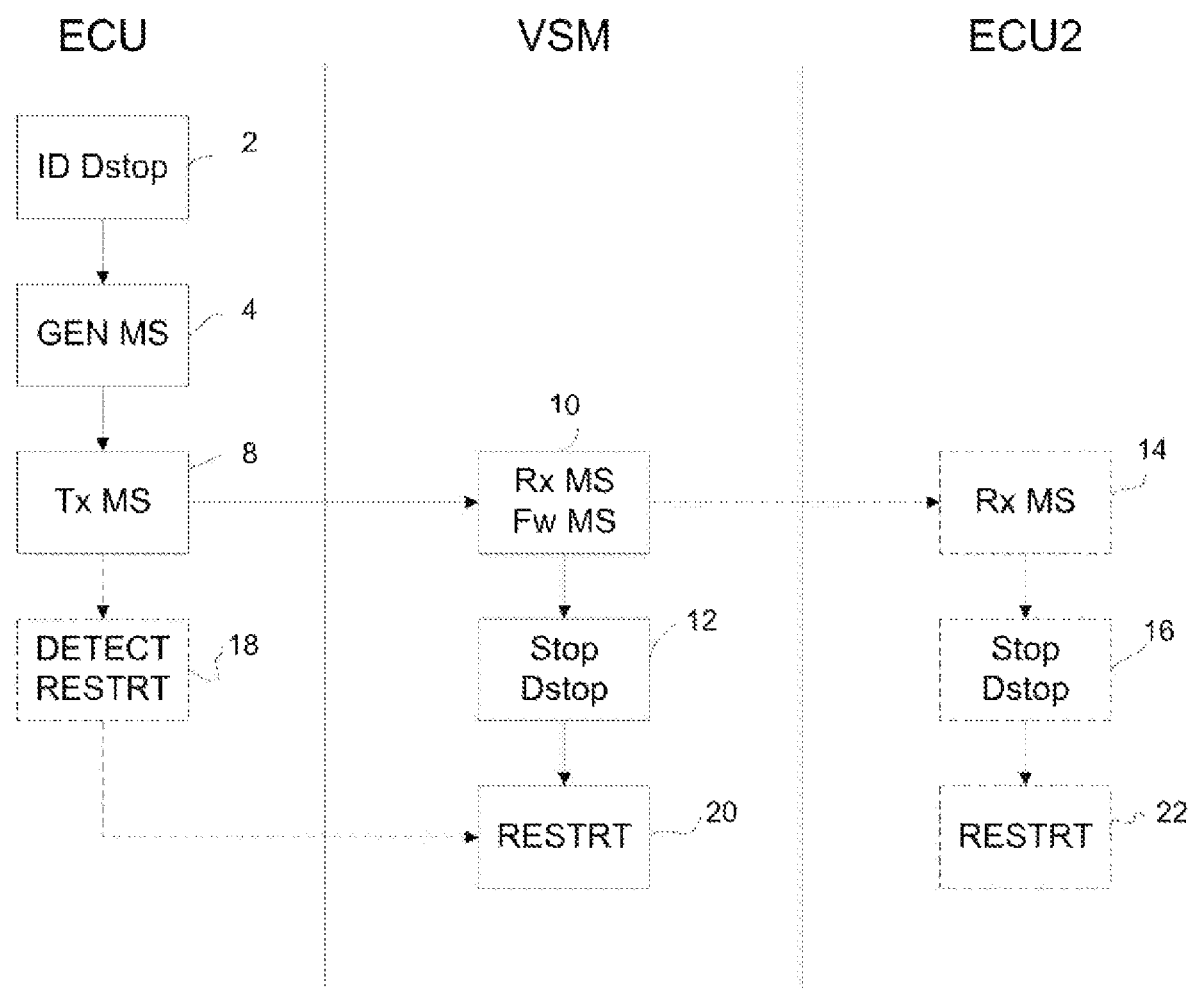

[Fig 2]
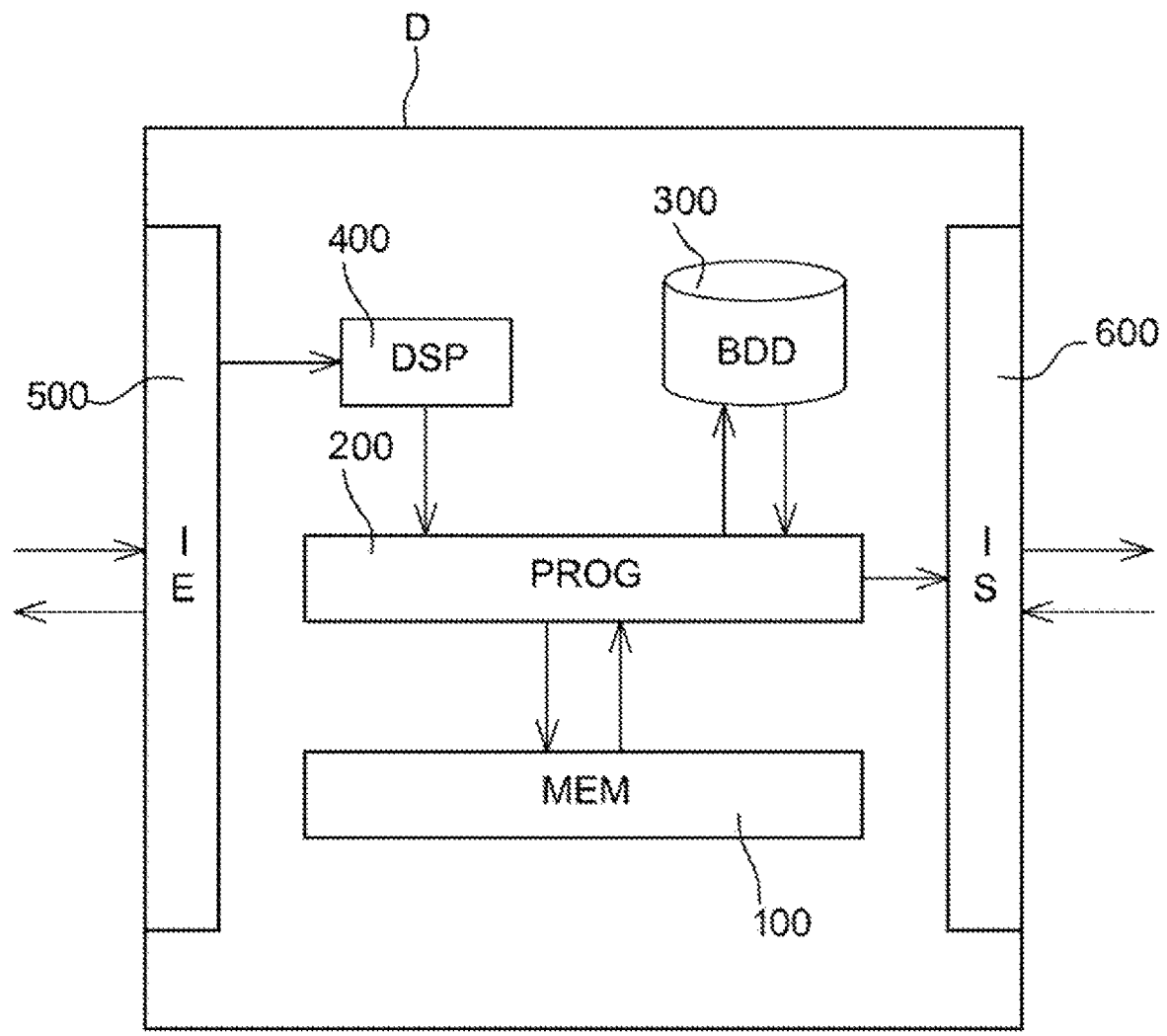

MANAGEMENT OF SUPERVISION OF AN ELECTRONIC COMPONENT OF A LAND MOTOR VEHICLE

CROSS-REFERENCE TO RELATED APPLICATIONS

This application is the US National Stage under 35 USC § 371 of International Application No. PCT/FR2021/051530, filed 7 Sep. 2021 which claims the priority of French application 2010747 filed on 20 Oct. 2020, the content (text, drawings and claims) of both being incorporated by reference herein.

BACKGROUND

The field of the disclosure is that of onboard electronics in a land motor vehicle. In particular, the management of the monitoring of an electronic component of the vehicle in the case of a scheduled temporary shutdown of the component is disclosed.

What is meant by "land motor vehicle" is any type of vehicle such as an automobile, a moped, a motorcycle, a warehouse robot, etc.

Vehicle electronic architectures have a supervisory device, which is connected to various internal networks of the vehicle (Ethernet, or CAN which stands for Controller Area Network, this also being described below with reference to FIG. 1). The supervisory device can monitor all of the vehicle's components and generate a fault code if a component does not communicate with the supervisory device in the agreed manner.

In particular, monitoring of the network is a mechanism that allows the supervisory device to monitor the presence of another component by checking that a periodic (or mixed) frame sent by the monitored component continues to be received. When reception of the periodic (or mixed) frame is interrupted for a certain duration, the supervisory device signals a fault.

Such monitoring is necessary for the correct operation of components (brakes, powertrain, lights, etc.) which are sometimes responsible for the safety of the vehicle's occupants. In particular, the operating safety requirements relating to such components and the supervisory device are of great importance, and sometimes lead, for example, to redundancy in some of these components/supervisory devices.

With the arrival of new vehicle functions such as the remote updating of component software, operating systems or firmware, the components comprise shutdown phases (typically when flashing the firmware). During these scheduled shutdown phases, the component can no longer be effectively monitored (it no longer sends its periodic frames for example). The supervisory device then erroneously detects a fault.

It has been proposed to stop monitoring during such a scheduled shutdown. However, such a stop means that monitoring is stopped for all of the components and is therefore not compatible with a remote update which should be as unnoticeable as possible.

SUMMARY

The disclosed method improves the above-described situation.

To this end, a first aspect relates to a method for managing a scheduled temporary shutdown of an electronic component monitored by a supervisory device, the component and the device being on board a land motor vehicle, the method comprising the steps of:

the component identifying a scheduled temporary shutdown;

the component generating a shutdown anticipation message comprising information regarding the duration of the shutdown of the component for the scheduled temporary shutdown;

transmitting the anticipation message from the component to the supervisory device;

the supervisory device stopping monitoring of the component for the duration of the shutdown as indicated by the information on the duration of the shutdown in the anticipation message.

A simple but reliable mechanism which takes into account the diversity and asynchronous nature of scheduled temporary shutdowns is therefore established.

Specifically, the transmission of the anticipation message is performed dynamically and at the initiative of the component in question, without this affecting the monitoring of the other components.

It then becomes possible to envisage the scheduled shutdown of the component being as unnoticeable as possible (except of course if this component is involved in the operation of the vehicle at the time when the shutdown is scheduled) and in any case without requiring other components not concerned by the scheduled shutdown to be stopped or run in a degraded mode.

Furthermore, the method complies with the requirements, particular to land motor vehicles, of safety while keeping costs low. Specifically, for sensitive components, the sending of the anticipation message can have redundancy and the method does not entail the sizing of additional memories for the execution thereof (only the information on the duration is temporarily retained by the supervisory device).

In one embodiment, the anticipation message further comprises at least one of the elements from among:

an identifier of the component; and information configured to explain the reason for the temporary shutdown.

In another embodiment, the method further comprises the steps of:

upon identification by the component of a restart of the component, sending a resume information message from the component to the supervisory device; and upon receipt of the restart message by the supervisory device, the supervisory device resuming monitoring of the component.

Thus, a scheduled shutdown that in practice was shorter in duration will not suspend monitoring unnecessarily.

In another embodiment, the monitoring by the supervisory device comprises periodic reception of verification messages from the component, which are configured to inform the supervisory device of the normal operation of the component.

In another embodiment, a secondary component is further included on board the vehicle, the secondary component monitoring the operation of the monitored component, the method further comprising the step of:

upon the supervisory device receiving the anticipation message, transmitting a secondary information message comprising the information on the duration of the shutdown of the component from the supervisory device to the secondary component.

In particular, in one embodiment, the method further comprises the step of:

stopping the monitoring of the component monitored by the secondary component for the duration of the shutdown as indicated by the information on the duration of the shutdown in the anticipation message.

The links between components are therefore taken into account and the method can thus be implemented in a complex environment with components monitoring one another.

For example, a telematic control unit undergoing a scheduled shutdown is monitored by other components which are, for example, fed with data by the telematic control unit. Without more detailed information on the scheduled shutdown, these components can enter into a degraded operating mode unnecessarily and for a long period of time. Furthermore, these other components may produce inconsistencies in their monitoring and therefore lead to the after-sales service replacing them mistakenly.

A second aspect relates to a computer program comprising instructions for implementing the method according to the first aspect, when these instructions are executed by a processor.

A third aspect relates to a system configured to manage a scheduled temporary shutdown of an electronic component monitored by a supervisory device, the system comprising the supervisory device and the monitored electronic component, the system being configured to be comprised on board a land motor vehicle, the monitored component comprising at least one processor and at least one memory which are arranged to perform the operations of:
identifying a scheduled temporary shutdown;
generating a shutdown anticipation message comprising information on the duration of the shutdown of the component for the scheduled temporary shutdown;
transmitting the anticipation message to the supervisory device;
the supervisory device comprising at least one processor and at least one memory which are arranged to perform the operation of:
the supervisory device stopping monitoring of the component for the duration of the shutdown as indicated by the information on the duration of the shutdown in the anticipation message.

A fourth aspect relates to a vehicle configured to comprise the system according to the third aspect.

DESCRIPTION OF THE FIGURES

Other features and advantages will become apparent from examining the detailed description hereinafter, and the appended drawings, in which:

FIG. 1 is a diagram illustrating the steps of a management method; and

FIG. 2 illustrates the structure of a device.

The method is described below with reference to the non-limiting application thereof to the case of a motor vehicle comprising an electronic component, a supervisory device and a secondary component. Such an application is purely illustrative and limited to a few components for the sake of clarity but, in practice, the method is used by several tens or hundreds of components, computers in particular, that are present in the vehicle. Furthermore, the method can be implemented on any type of land motor vehicle such as a motorcycle, a coach or even a robot in a factory.

FIG. 1 illustrates a method for managing supervision of an electronic component of a land vehicle.

The method relates to the management of a scheduled temporary shutdown of an electronic component monitored by a supervisory device.

The electronic component corresponds to any type of component present in the vehicle and connected to the supervisory device by an internal network.

The internal network of the vehicle corresponds to any communication network configured to exchange data between at least two electronic components of the vehicle. Examples of wired internal networks are CAN (Controller Area Network) networks, Ethernet, FlexRay or LIN (Local Interconnect Network) networks. Examples of radiofrequency internal networks are LoRa, Bluetooth or Wi-Fi networks.

The electronic component corresponds to any component configured to process any data relating to the vehicle's operation. One example of a component is a computer, also called an ECU (Electronic Control Unit). The computer may be responsible for various functions in the vehicle such as the management of driver assistance, the actuation of the windshield wipers or the broadcasting of music into the passenger compartment. Another example of a component is the TCU (Telematic Control Unit).

The supervisory device VSM corresponds to any device configured to check that at least one electronic component is operating correctly. In particular, in one embodiment, the monitoring by the supervisory device comprises periodic reception of verification messages from the component, which are configured to inform the supervisory device of the normal operation of the component. Thus, monitoring is a mechanism that allows the supervisory device to monitor the presence of another component by checking that a periodic (or mixed) frame sent by the monitored component continues to be received. When the frame is not received, an error is generated and flagged to the entities (after-sales, etc.) responsible for following up on faults. The supervisory device may be comprised (in particular as a straightforward software module) within an electronic component, such as the BSI (Built-in Systems Interface) for example.

In a step 2, the component ECU identifies a scheduled temporary shutdown Dstop. The scheduled temporary shutdown corresponds, for example, to an ECU reboot as part of a firmware update. Other types of scheduled temporary shutdown, such as those relating to a straightforward software update or to a version upgrade of one of the networks to which the ECU is connected, are possible. The component identifies the scheduled temporary shutdown itself but this can also be carried out in a servile manner, for example because a component responsible for the ECU's operation has detected the shutdown.

The shutdown may concern the component's operation in its entirety or only part of the component's operation. Typically, flashing of the component requires the component to be rebooted, and therefore shut down completely, but other shutdowns concern only certain functions or parts of the component. For example, for some software updates, the component is not shut down but the update causes the periodic frames to stop being sent to the supervisory device. Normal operation is suspended in order to update certain functions, but the component is not necessarily completely shut down.

In a step 4, a step of the component generating a shutdown anticipation message MS comprising information on the duration of the shutdown of the component for the scheduled temporary shutdown is implemented. In one embodiment, the anticipation message further comprises at least one of the elements from among:

an identifier of the component ECU;

information configured to explain the reason for the temporary shutdown.

The identifier of the component corresponds, for example, to its address in an internal network. The information configured to explain the reason for the temporary shutdown is, for example: firmware update, FlexRay network version upgrade, etc.

The duration of the shutdown of the component for the scheduled temporary shutdown corresponds to the duration for which the component is not able to be monitored by the supervisory device. This duration may thus take into account the time required to restart the software of the ECU responsible for transmitting the periodic supervisory frames for example.

The anticipation message is transmitted from the component to the supervisory device in a step 8, which receives it in a step 10. The anticipation message may be a dedicated message or may be incorporated into another message, for example into the verification message (periodic supervisory frame). The anticipation message may be transmitted with redundancy (for example three times over 10 milliseconds).

In a step 12, monitoring of the component is stopped by the supervisory device for the duration Dstop of the shutdown as indicated by the information on the duration of the shutdown in the anticipation message MS.

Once the duration Dstop has elapsed, the supervisory device VSM resumes its monitoring of the component ECU in a step 20. Thus, for example, if after Dstop VSM does not receive a verification message (periodic supervisory frame), it detects an error.

In one optional embodiment (steps in dashed lines in FIG. 1), the method further comprises the steps of:
- in a step 18, upon the component identifying a restart of the component, sending a resume information message from the component to the supervisory device. The resume information message may comprise the resume information, the identifier of the component ECU and information configured to explain the reason for the resumption;
- in a step 20, upon the supervisory device receiving the resume message, the supervisory device resuming monitoring of the component. Thus, if ECU detects an early restart, it causes monitoring to resume before Dstop has elapsed. In one embodiment, the resume information message is transmitted in all cases (before or after Dstop has elapsed).

In one optional embodiment (steps in dashed lines in FIG. 1), a secondary component ECU2 is also included on board the vehicle. The secondary component monitors the operation of the component ECU.

This is typically a component ECU2 whose operation is related to the operation of ECU. For example, this may be a component ECU2 (self-driving computer for example) that cannot operate without a continuous exchange with ECU (the telematic control unit, TCU, for example). Specifically, in the example of the self-driving computer, and depending on the level of autonomy, it may be necessary to continuously have functional link with the telematic control unit in order to have up-to-date environmental data available.

The method then further comprises, in step 10:
- upon the supervisory device receiving the anticipation message, transmitting a secondary information message comprising the information on the duration of the shutdown of the component from the supervisory device to the secondary component. This may mean simply transferring the anticipation message MS or incorporating the duration Dstop into any other message intended for ECU2.

A number of embodiments are possible for the transmission of the secondary information message. The message may be broadcast by VSM, i.e. transmitted to any component connected to VSM in the internal network in question. It may also be transmitted only to those components which are concerned (a table of links between components is then present in VSM). In another embodiment, ECU transmits the information directly to ECU2.

Once the secondary information message has been received in a step 14, monitoring of the component ECU monitored by the secondary component ECU2 is stopped in a step 16 for the duration Dstop of the shutdown as indicated by the information on the duration of the shutdown in the anticipation message. Monitoring resumes in a step 22 after Dstop. In one embodiment, the early restart (step 18) is also taken into account by ECU2 by transferring the message from VSM.

FIG. 2 shows one example of a device D included in a system configured to manage a scheduled temporary shutdown of an electronic component monitored by a supervisory device, the system implementing the method described above with reference to FIG. 1 and comprising the supervisory device VSM, the monitored electronic component ECU and, in one embodiment, the component ECU2.

This device D may take the form of a housing comprising printed circuits, any type of computer or else a smartphone.

The device D comprises a random-access memory 100 for storing instructions for the implementation by a processor 200 of at least one step of the methods as described above. The device also comprises mass storage 300 for storing data that are intended to be kept after the implementation of the method.

The device D may further comprise a digital signal processor (DSP) 400. This DSP 400 receives data for shaping, demodulating and amplifying these data in a manner known per se.

The device also comprises an input interface 500 for receiving the data implemented by methods as described above and an output interface 600 for transmitting the data implemented by the method.

The present method is not limited to the embodiments described above by way of example; it extends to other variants.

Thus, an embodiment has been described which corresponds to an illustrative electronic architecture (a component ECU, a device VSM, etc.) for a motor vehicle. The present method is also applicable to other electronic architectures (different number of computers, etc.).

The invention claimed is:

1. A method for managing a scheduled temporary shutdown of an electronic monitored component monitored by a supervisory device and by a secondary component, the monitored component, the supervisory device, and the secondary component being comprised on board a land motor vehicle, the method comprising steps of:
   the monitored component identifying the scheduled temporary shutdown;
   the monitored component generating a shutdown anticipation message comprising information regarding a duration of the scheduled temporary shutdown of the monitored component;
   the monitored component transmitting the shutdown anticipation message to the supervisory device;

the supervisory device stopping monitoring of the monitored component for the duration of the scheduled temporary shutdown as indicated by the information on the duration of the scheduled temporary shutdown in the shutdown anticipation message, the supervisory device, upon the receipt of the shutdown anticipation message, transmitting a secondary information message to the secondary component; the secondary information message comprising the information on the duration of the scheduled temporary shutdown of the monitored component; and, the secondary component stopping the monitoring of the monitored component for the duration of the scheduled temporary shutdown as indicated by the information in the shutdown anticipation message.

2. The method as claimed in claim 1, wherein the shutdown anticipation message further comprises at least one of:
an identifier of the component; and
information configured to explain a reason for the scheduled temporary shutdown.

3. The method as claimed in claim 1, further comprising the steps of:
upon the monitored component identifying a restart of the monitored component, the monitored component sending a resume information message to the supervisory device;
upon the supervisory device receiving the resume message, the supervisory device resuming monitoring of the monitored component.

4. The method as claimed in claim 1, wherein the monitoring by the supervisory device comprises periodically receiving verification messages from the monitored component, which are configured to inform the supervisory device of normal operation of the component.

5. A computer program comprising instructions for implementing the method as claimed in claim 1, wherein these instructions are executed by a processor.

6. A system configured to manage a scheduled temporary shutdown of an electronic monitored component monitored by a supervisory device and by a second component, the system comprising the supervisory device, the second component, and the monitored electronic component, the system being on board a land motor vehicle,
the monitored component comprising at least one processor and at least one memory which are arranged to perform operations of:
identifying a scheduled temporary shutdown;
generating a shutdown anticipation message comprising information on a duration of the scheduled temporary shutdown of the monitored component;
transmitting the shutdown anticipation message to the supervisory device;
the supervisory device comprising at least one processor and at least one memory which are arranged to perform the operation of:
stopping monitoring of the monitored component for the duration of the scheduled temporary shutdown as indicated by the information on the duration of the shutdown in the shutdown anticipation message; and,
upon receipt of the shutdown anticipation message, transmitting a secondary information message to the secondary component; the secondary information message comprising the information on the duration of the shutdown of the monitored component; and,
the secondary component, upon receipt of the secondary information message, stopping the monitoring of the monitored component for the duration of the scheduled temporary shutdown as indicated by the information in the shutdown anticipation message.

7. A land motor vehicle comprising the system as claimed in claim 6.

8. A method for managing a scheduled temporary shutdown of an electronic component monitored by a supervisory device, the component and the device being comprised on board a land motor vehicle, the method comprising steps of:
the component identifying a scheduled temporary shutdown;
the component generating a shutdown anticipation message comprising information on a duration of the scheduled temporary shutdown of the component;
the component transmitting the shutdown anticipation message to the supervisory device;
the supervisory device stopping monitoring of the component for the duration of the scheduled temporary shutdown as indicated by the information on the duration of the scheduled temporary shutdown in the shutdown anticipation message; wherein the vehicle further includes a secondary component, the secondary component monitoring the operation of the component, the method further comprising the step of:
the supervisory device, upon receiving the shutdown anticipation message, transmitting a secondary information message to the secondary component; the secondary information message comprising the information on the duration of the scheduled temporary shutdown of the component; and
the secondary component stopping the monitoring of the component for the duration of the scheduled temporary shutdown as indicated by the information on the duration of the scheduled temporary shutdown in the shutdown anticipation message.

9. The method according to claim 1 wherein, once the duration has elapsed, the supervisory device resumes monitoring of the monitored component.

10. The method according to claim 3 wherein the monitored component sends the resume information message to the supervisory device prior to the end of the shutdown duration.

* * * * *